April 22, 1952  H. S. PALMER  2,593,597
MILKING PLANT

Filed Oct. 1, 1949  2 SHEETS—SHEET 1

INVENTOR
Harold S. Palmer
By Rudolph L. Lowell
Atty.

April 22, 1952 H. S. PALMER 2,593,597
MILKING PLANT
Filed Oct. 1, 1949 2 SHEETS—SHEET 2
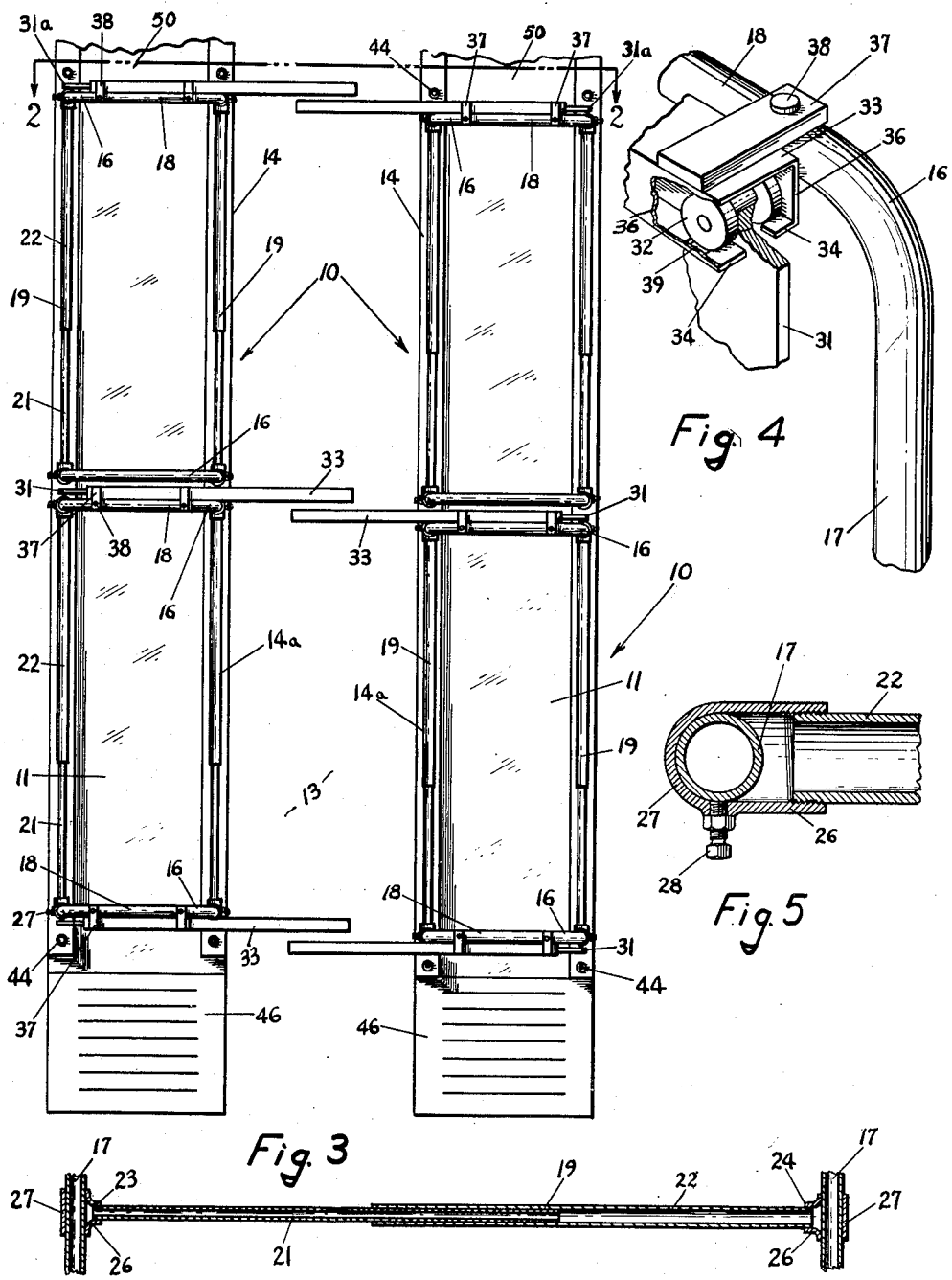
INVENTOR
Harold S. Palmer
By *[signature]*
atty.

Patented Apr. 22, 1952

2,593,597

UNITED STATES PATENT OFFICE 2,593,597

MILKING PLANT

Harold S. Palmer, Keota, Iowa

Application October 1, 1949, Serial No. 119,120

3 Claims. (Cl. 119—27)

This invention relates generally to milking plants and in particular to a milking plant in which the cows are prepared for milking and milked in successive groups while headed in the same direction through the plant.

An object of this invention is to provide an improved milking plant.

A further object of this invention is to provide a milking plant in which a passageway for taking cows in single file order is comprised of a series of longitudinally spaced, but closely adjacent, sections. Doors or partition members at the ends of the sections are linearly movable to divide the passageway into separate stall units corresponding in number to the sections thereof.

Still another object of this invention is to provide a stall unit which is of a width and adjustable as to length so that a cow therein is substantially restrained against sidewise and back and forth movement during a milking operation.

Yet a further object of this invention is to provide a milk plant in which a pair of cow passages or lanes are arranged in a parallel spaced relation, with the floor surfaces thereof at a higher level than the floor surface therebetween to facilitate handling of the cows in the passages. Each passage is longitudinally divided into sections, with each section being of a length to accommodate a cow therein. Movably supported on the sections are door members for closing the ends thereof. With a door at one end of a passage closed, the cows are moved in single file order into the passage from its other end, in number corresponding to the sections in the passage. The remaining doors in the passage are then closed to confine the cows in separate stalls, as formed by the closed doors. After the cows are milked, the doors are opened and the cows, while headed in the same direction, are moved from the passage.

Still another object of this invention is to provide a milking plant capable of efficiently handling large or small breeds of cattle, adapted to be used with milker machines of pail, portable or combine type, and of a construction such that it can be installed within a relatively small floor space.

A feature of this invention is found in the provision of a milking plant in which a cow passage is comprised of a series of open ended stall units arranged end to end. Upright door members are movably supported at the ends of the stall units such that the adjacent ends of the stall units have a common door member. The doors are movable transversely of the stall units from positions across the passage to positions projected laterally outwardly from a side of the passage. As a result a group of cows may be driven into the passage from one end, and then confined within the passage for milking by closing the doors. When milking is completed, the doors are opened and the cows moved in the same direction out of the passage to make room for a second group of cows.

Further objects, features and advantages of this invention will appear from the following description when taken in connection with the accompanying drawing, in which:

Fig. 3 is a plan view of the milking plant shown in Fig. 1;

Fig. 4 is an enlarged fragmentary detail perspective assembly view of a door member and its supporting means, which assembly forms part of the milking plant of this invention;

Fig. 5 is an enlarged detail sectional view as seen along the line 5—5 in Fig. 1; and Fig. 6 is a longitudinal sectional view of a side member forming part of a stall unit.

Figure 1:
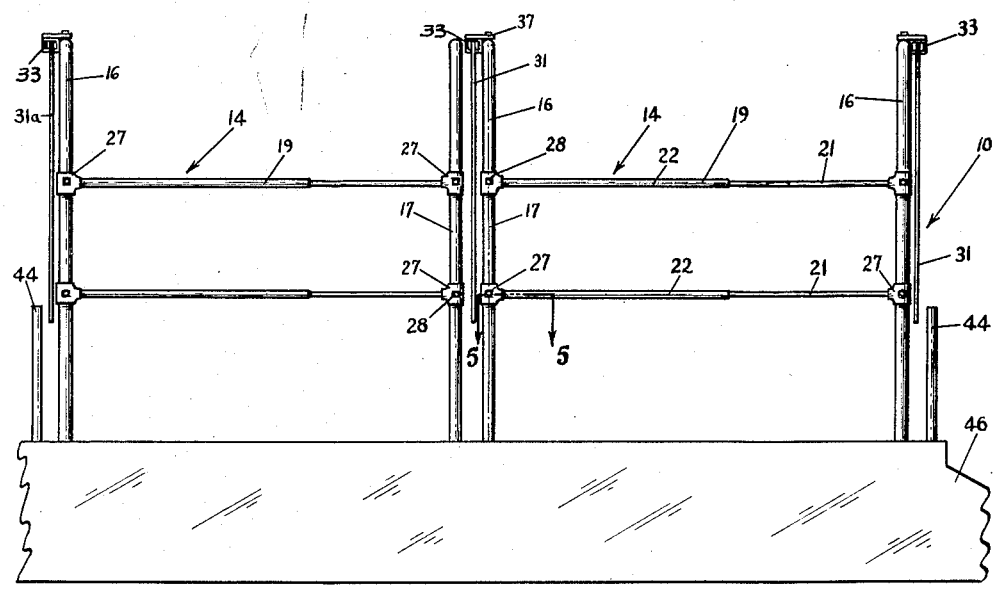
Fig. 1 is a side elevational view of the milking plant of this invention.

With reference to the drawings, the milking plant of this invention is illustrated in Figs. 1 and 3 as including a pair of cow passageways or lanes, indicated generally at 10, arranged in a spaced parallel relation. The bottoms or floor surfaces 11 of the passageways 10 (Fig. 2) are at a higher level than the floor surface 12 between the passageways, so that a trough 13 is formed between the passageways for a purpose to appear later. Since the passageways 10 are of a like construction, only one thereof will be described in detail, with similar numerals being applied to like parts.

A passageway 10 is comprised of a series of sections or stall units, designated generally at 14 (Figs. 1 and 2), arranged end to end in a straight row. Each stall unit 14 includes a pair of end frame members 16 of a tubular construction and of an arch or inverted U-shape having upright legs 17 and an upper connecting base portion 18. Each pair of end members 16, for a stall 14, are connected together by adjustable side members 19 (Figs. 1 and 6), also of a tubular construction, with each side member 19 comprising a pipe section 21 which is in telescopic engagement within a pipe section 22.

The outer ends 23 and 24 (Fig. 6) of the pipe sections 21 and 22, respectively, are secured within connections 26 of T-fittings 27, which are slidably supported for vertical movement about the legs 17 of the end members 16. The side members 19 are releasably maintained in vertically adjusted positions on the leg members 17 by the provision of friction screws 28 (Figs. 1 and 5) threadable within the T-fittings 27 for frictional engagement with the end member legs 17.

The stall units 14 are closed at their opposite ends by means including upright partition members or doors 31, the upper ends of which (Fig. 4) are provided with a pair of laterally spaced roller assemblies, indicated at 32, ridable within a track member 33 of a substantially inverted channel shape having inwardly projected track portions 34 at the free ends of its leg sections 36. At longitudinally spaced positions on the top side of the track member 33 are a pair of attaching brackets or straps 37 (Figs. 3 and 4), which are secured to the base portion 18 of an end member 16 by bolts or the like 38.

Figure 2:
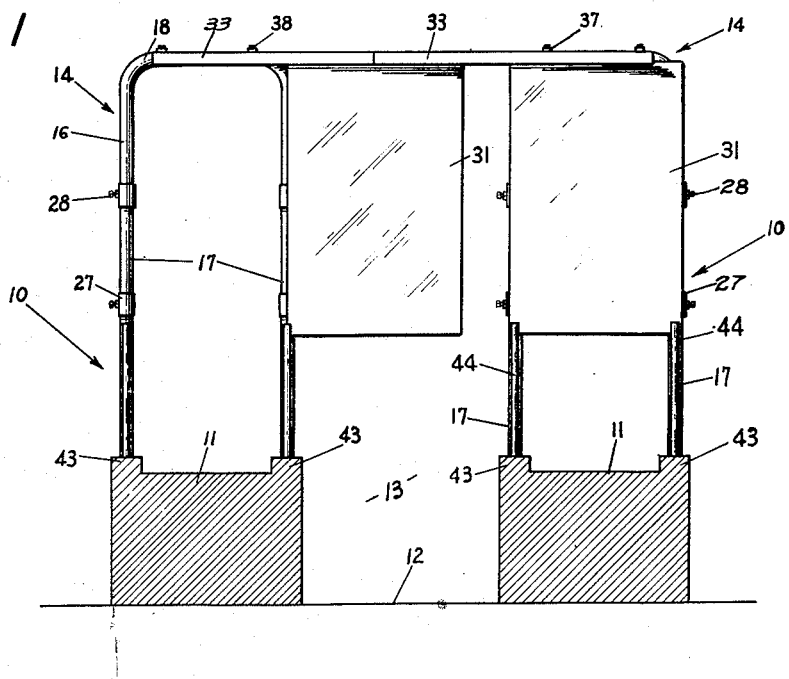
Fig. 2 is a sectional view as seen along the line 2—2 in Fig. 3.

As best appears in Fig. 3, the track members 33 are of a length greater than the transverse dimension of an end member 16 so that a door 31 is movable to a first position extended across an end member 16, to close a stall unit 14, and to a second position projected laterally outwardly from an end member 16, to open a stall unit 14, as illustrated for the doors 31 in Fig. 2. In order to releasably hold a door 31 in either a closed or open position, the track portions 34, at positions spaced inwardly from the ends thereof, are formed with oppositely arranged recesses or notches 39. Thus on movement of a door 31 to an open or closed position, the roller assembly 32 leading in the direction of movement of the door 31, drops within the notches 39 to define a desired moved position.

In the installation of the milking plant of this invention, the end members 16 for each stall unit 14 are spaced a distance apart depending upon the breed of cattle to be milked. In other words, the cows vary appreciably as to length and in the present invention it is contemplated that the length of the stall unit 14 be substantially equal to the length of the cow, so that when the cow is received within a stall unit, and the doors 31 for such stall unit are closed, the cow is substantially restrained against back and forth movement. This desired length is readily obtained by the provision of the adjustable side members 19. The adjustment of the side members 19 vertically of the legs 17 on the end members 16 is such as to provide ready access of the milking plant operator to a cow from the side of a stall unit, and a side guard to prevent a cow from kicking laterally outwardly of a stall.

The stall units 14, including a pair of end members 16 and associated side members 19, are then assembled end to end, and in a permanent relation, by setting the lower ends of the legs 17 within the concrete floor surface 11. To eliminate any unnecessary spreading of cow manure, dirt and the like through the milking plant, it is contemplated that each floor surface 11 form a passageway 10, and as illustrated in Fig. 2, be formed with a pair of oppositely arranged upright projections or walls 43 which extend continuously over the full length of the passageway 10. The legs 17 may then be set within the walls 43 so as to extend upwardly therefrom.

The adjacent end frame members 16 of the stall units 14 are spaced a distance apart to provide for the location therebetween of a movable door 31 and its supporting track member 33. Since this spacing is only on the order of about five inches, it is seen that with the doors 31 moved to their open positions, the side members 19 form a substantially continuous confining passageway for cows in single file order.

With reference to Fig. 3, it is seen that each of the end members 16 for the end stalls indicated as 14a is provided with a track 33 and door 31, and that the oppositely arranged stalls, indicated at 14, have a track and door assembly carried on only one of their end members 16. As a result, the adjacent ends of the stalls 14 and 14a have a common door and track assembly.

Although in Fig. 3 each passageway 10 is illustrated as including only a pair of stalls 14, it is to be understood that any number of stalls may be used. Further, it will be noted that the stalls arranged at opposite sides of the trough 13 are in a staggered or longitudinal offset relation to provide for a clearance relation of the doors 31 to positions within the trough 13. A door 31, located between the adjacent ends of the stall units 14 and 14a is limited against swinging movement laterally of its associated track 33 by the engagement of the lower end of the door with the legs 17 of the adjacent end frame members 16. The doors 31 at each end of a passageway 19 are limited against lateral swinging movement by the provision of upright stop members 44 set in the wall portions 43 of the floor 11 at a position spaced outwardly from the legs 17 of the outer end frame members 16. The rows of stall units 14 are spaced a distance apart such that the trough 13 is of a width to conveniently accommodate the type of milker machine (not shown) to be used, and to give ample working space for the machine operator. For the installation shown in Fig. 3, the over-all width of the trough 13 and passageways 10 is about nine feet, with the length necessary to accommodate the stalls longitudinally being about fifteen feet. Ramps for the passageways 10 are indicated at 46.

In use, and with reference to Fig. 3, assume that the cows are to be moved in single file order into the passageways 10 over the ramps 46. The end doors indicated at 31a are then moved to their closed positions and the remaining doors 31 are moved to their open positions. Two cows are then driven into each passageway 10, and the doors 31 are moved into their closed positions whereby to separately confine a cow within each section or stall unit 14 of a passageway 10. The cows in one passageway 10 are then prepared for milking, and the milking machine applied thereto. While this first set or group of cows are being milked, the second group of cows in the other passageway 10 are prepared for milking. On the completion of the preparation of the second group of cows for milking, the first group of cows has been milked. The milking machines are then transferred from the first group of cows to the second group of cows, and the first group of cows are turned out and a third group brought in and prepared for milking while the second group is being milked. In this manner, and after the first group of cows has been prepared for milking, there is a continuous succession of milking operations with a resultant saving in time and efficiency. To move a group of cows from a passageway 10, it is only necessary to open all of the doors 31, and with the cows headed in the same direction as when they entered the passageway over a ramp 46, they are moved from a passageway end, indicated at 50.

From the above description it is seen that the invention provides a milking plant which is of a simple and compact construction, capable of application to the milking of small and large herds, and adapted to be readily installed within a relatively small floor space. Further, the construction of the sections or stall units of a cow passageway is such as to provide for their economical manufacture, shipping and storage in a nested relation, and assembly for use by an unskilled workman.

Although the invention has been described with respect to a preferred embodiment thereof, it is to be understood that it is not to be so limited since changes and modifications can be made therein which are within the full-intended scope of this invention, as defined by the appended claims.

I claim:

1. In a milking plant, a pair of stall structures arranged in a spaced parallel relation, with the floor surface in the space between said pair of stall structures being at a lower level than the floor surfaces of said stall structures, an upright transverse frame at the end of each stall in a stall structure, with the frames in one of said stall structures being opposite the frames in the other of said stall structures, transverse horizontal support members mounted on a pair of oppositely arranged frames and extended toward each other so as to be in a longitudinally spaced overlapping relation in said space, and upright transverse doors movably supported on said support members for transverse movement to first positions across said stall structures and to second positions extended across the space between said pair of stall structures.

2. A sectional stall structure comprised of a plurality of sections arranged end to end in linear alignment with the adjacent ends of the sections being longitudinally spaced from each other, upright partition doors located within the space between adjacent sections, other upright partition doors at opposite ends of said stall structure, and means on said sections supporting said doors for linear movement transversely of said stall structures including horizontal transverse door carrying members projected outwardly from one side of said stall structure, whereby said doors in one position therefor are extended across said stall structure and in a second position therefor are projected from one side of said stall structure.

3. A sectional stall structure comprising a plurality of sections arranged end to end in linear alignment with the adjacent end frame members of the sections being longitudinally spaced from each other, a transverse horizontal support member connected to the upper portion of an end frame member of each section and positioned in the space between adjacent longitudinal sections of the stall structure, and an upright transverse door movably supported on said support member between each stall section for transverse movement relative to said stall sections.

HAROLD S. PALMER.

REFERENCES CITED

The following references are of record in the file of this patent:

UNITED STATES PATENTS

| Number | Name | Date |
| --- | --- | --- |
| 1,043,293 | Boyce | Nov. 5, 1912 |
| 1,928,819 | Neller | Oct. 3, 1933 |
| 2,269,012 | De Carli | Jan. 6, 1942 |

FOREIGN PATENTS

| Number | Country | Date |
| --- | --- | --- |
| 219,657 | Germany | Mar. 9, 1910 |